(12) United States Patent
Li

(10) Patent No.: US 12,026,201 B2
(45) Date of Patent: Jul. 2, 2024

(54) AUTOMATED PRODUCT IDENTIFICATION WITHIN HOSTED AND STREAMED VIDEOS

(71) Applicant: GOOGLE LLC, Mountain View, CA (US)

(72) Inventor: Yuanzhen Li, Newton, MA (US)

(73) Assignee: GOOGLE LLC, Mountain View, CA (US)

(*) Notice: Subject to any disclaimer, the term of this patent is extended or adjusted under 35 U.S.C. 154(b) by 492 days.

(21) Appl. No.: 17/334,923

(22) Filed: May 31, 2021

(65) Prior Publication Data

US 2022/0382808 A1 Dec. 1, 2022

(51) Int. Cl.
| | |
|---|---|
| *G06F 16/783* | (2019.01) |
| *G06F 16/71* | (2019.01) |
| *G06K 9/00* | (2022.01) |
| *G06V 20/20* | (2022.01) |
| *G06V 20/40* | (2022.01) |

(52) U.S. Cl.
CPC .......... *G06F 16/7837* (2019.01); *G06F 16/71* (2019.01); *G06F 16/7844* (2019.01); *G06V 20/20* (2022.01); *G06V 20/46* (2022.01)

(58) Field of Classification Search
CPC .. G06F 16/7837; G06F 16/71; G06F 16/7844; G06V 20/20; G06V 20/46; G06V 10/7715; G06V 10/803
See application file for complete search history.

(56) References Cited

U.S. PATENT DOCUMENTS

| | | | |
|---|---|---|---|
| 2013/0174195 A1* | 7/2013 | Witenstein-Weaver | H04N 21/4828 725/60 |
| 2015/0341410 A1* | 11/2015 | Schrempp | G06V 10/761 709/231 |
| 2017/0195629 A1* | 7/2017 | Wexler | H04W 4/029 |
| 2019/0141410 A1* | 5/2019 | Zverina | H04N 21/23418 |
| 2019/0180108 A1* | 6/2019 | Catalano | H04N 21/812 |
| 2020/0065607 A1* | 2/2020 | Jouhikainen | G06N 20/00 |
| 2021/0090449 A1* | 3/2021 | Smith | G06V 10/7788 |
| 2021/0321166 A1* | 10/2021 | Jeong | H04N 21/44008 |
| 2021/0383579 A1* | 12/2021 | Lam | G06V 10/764 |
| 2022/0318555 A1* | 10/2022 | Ben-Ari | G06N 3/04 |

* cited by examiner

*Primary Examiner* — Bobbak Safaipour
*Assistant Examiner* — Jongbong Nah
(74) *Attorney, Agent, or Firm* — Young Basile Hanlon & MacFarlane, P.C.

(57) ABSTRACT

Automated product identification within hosted and streamed videos is performed based on video content of a video received at an online video platform and text content associated with the video. First embeddings representative of one or more first candidate products are determined based on video content of the video, such as one or more frames selected from within the video. Second embeddings representative of one or more second candidate products are determined based on text content associated with the video, such as a title, description, or transcript of the video. A product candidate index is produced based on the second embeddings. A product identification representative of a product featured in the video is determined based on a comparison of the first embeddings against entries of the product candidate index, such as including by a nearest neighbor search responsive to the comparison. An indication of the product identification is then output at the online video platform.

20 Claims, 10 Drawing Sheets

AUTOMATED PRODUCT IDENTIFICATION WITHIN HOSTED AND STREAMED VIDEOS

BACKGROUND

Digital video streams may represent video using a sequence of frames or still images. Digital video can be used for various applications including, for example, video conferencing, high definition video entertainment, video advertisements, or sharing of user generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for automated product identification within hosted and streamed videos.

A method according to an implementation of this disclosure comprises receiving a video at an online video platform, detecting a first object within one or more frames selected from the video, determining first embeddings based on pixel information associated with the first object, determining one or more object candidates based on entities extracted from text content associated with the video, detecting a second object within one or more images identified responsive to a search based on the one or more object candidates, determining second embeddings based pixel information associated with the second object, producing a product candidate index based on the second embeddings, determining a number of nearest neighbors based on a comparison of the first embeddings against entries of the product candidate index, determining a product identification representative of a product featured in the video based on the number of nearest neighbors, and outputting an indication of the product identification at the online video platform.

An apparatus according to another implementation of this disclosure comprises a memory and a processor configured to execute instructions stored in the memory to receive a video at an online video platform, determine first embeddings representative of one or more first candidate products based on video content of the video, determine second embeddings representative of one or more second candidate products based on text content associated with the video, produce a product candidate index based on the second embeddings, determine a product identification representative of a product featured in the video based on a comparison of the first embeddings against entries of the product candidate index, and output an indication of the product identification at the online video platform.

A non-transitory computer readable storage device according to yet another implementation of this disclosure includes program instructions that, when executed by a processor, cause the processor to perform operations. The operations comprise determining first embeddings representing first candidate products based on video content of a video, determining second embeddings representing second candidate products based on text content associated with the video sequence, determining a product identification representative of a product featured in the video based on a comparison of the first embeddings and the second embeddings, and outputting an indication of the product identification.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
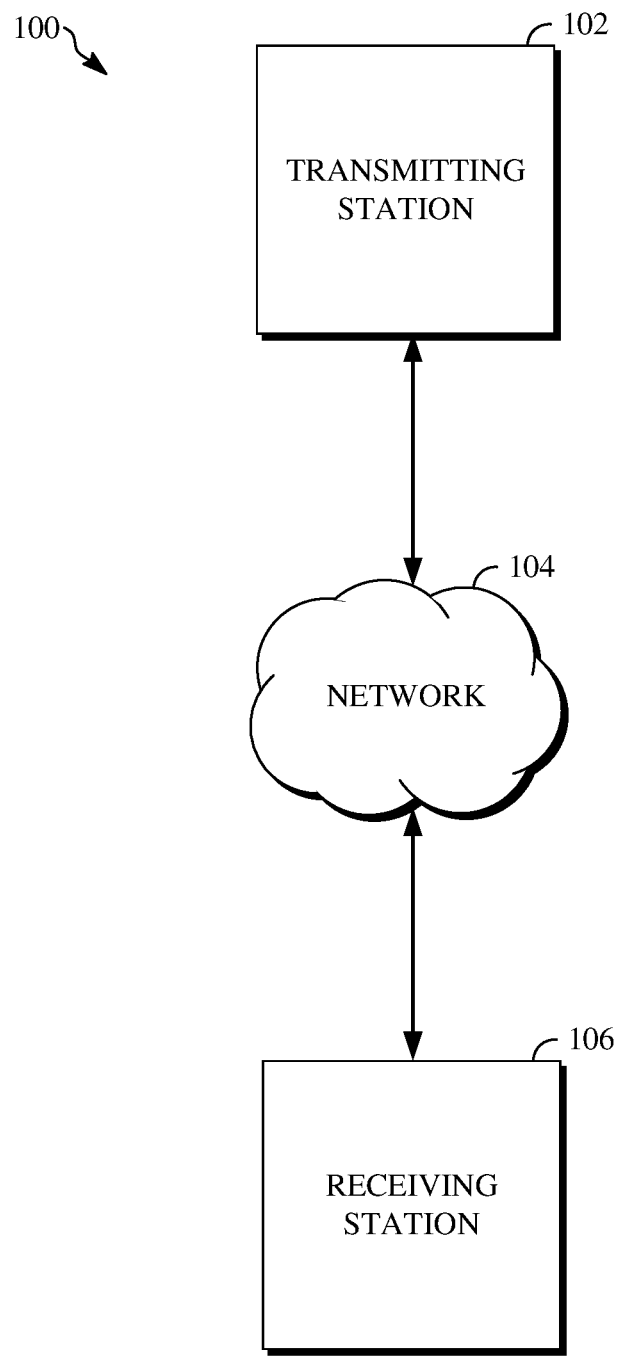
FIG. 1 is a schematic of an example of a video platform system.

Online video platforms, such as YouTube, receive years-worth of new user generated videos every day, which are watched by viewers around the world. User generated video content, which may include both pre-recorded videos and livestreamed videos, generally features one or more people or things. One particular example of user generated video content which continues to grow increasingly popular with viewers are video product reviews, which are videos which feature a product and may be uploaded by social media influencers, website personalities, or the like. A video product review may take up an entire video or may be limited to only a portion of a video in which the rest of the video relates to other people or things. A video product review typically includes some information about a subject product that the video uploader intends to feature, promote, sell, or otherwise indicate to viewers.

Given that viewers of a video product review are likely to want to learn more about or purchase the subject product, it is important that information identifying the subject product be easily available to the viewer. Conventionally, to enable viewer access to such product information, a video uploader is required to manually label or link products, such as within the text describing the video. However, this manual process requires time, many include typographical or other errors, and is entirely reliant upon the knowledge of the video uploader. For example, a video uploader may unknowingly link a different product in a video description, may omit key information about the product (e.g., manufacturer, model type, etc.), or the like. Nevertheless, and given the continuing popularity of video product reviews, it is important to be able to accurately identify a product being promoted in a video.

One solution which may be available is to leverage existing computer vision technology configured for object detection to identify products, however such a solution may fail for one or more reasons. For example, an object detection system may incorrectly identify an object within background imagery of video content and misrepresent that as the subject product. In many cases, user generated video content shows multiple people or things, so the potential for a false positive or false negative remains. Furthermore, it can be difficult to successfully disambiguate among similar-looking products using visual signals alone. Another solution may use language processing to identify products, such as based on a transcript of a user generated video. However, this solution may also fail to identify a product for one or more reasons, for example, due to the difficulty in understanding intentionality within text. In particular, intention is an important factor for understanding whether a product is being promoted as opposed to just being mentioned in passing. Where a transcript of a video or a written description thereof mentions multiple products, it is difficult to successfully determine by text processing which is the subject product being promoted with intentionality. Hence, existing solutions for video and textual processing for product identification each suffer drawbacks.

Implementations of this disclosure address problems such as these by automated product identification within hosted and streamed videos performed based on video content of a video received at an online video platform and text content associated with the video. First embeddings representative of one or more first candidate products are determined based on video content of the video, such as one or more frames selected from within the video. Second embeddings representative of one or more second candidate products are determined based on text content associated with the video, such as a title, description, or transcript of the video. A product candidate index is produced based on the second embeddings. A product identification representative of a product featured in the video is determined based on a comparison of the first embeddings against entries of the product candidate index, such as including by a nearest neighbor search responsive to the comparison. An indication of the product identification is then output at the online video platform.

The implementations for automated product identification within hosted and streamed videos disclosed herein may be used to automatically identify products in both pre-recorded and livestreamed videos and to improve product-related search and discovery capabilities within an online video platform which hosts those videos and/or through an internet search engine. For example, user generated video content may be automatically associated with information associated with a product identified using the implementations of this disclosure, and a person searching for that product or for videos of that product may be presented with search results including the user generated video content, even without manual user labeling or annotation. The implementations for automated product identification within hosted and streamed videos disclosed herein may further be used to enhance user generated video content. For example, relevant links to a product identified within a video may be presented to viewers by the online video platform as the product is being discussed within the video.

Further details of techniques for automated product identification within hosted and streamed videos are described herein with initial reference to a system in which such techniques can be implemented. FIG. 1 is a schematic of an example of a video platform system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for the uploading, processing, and/or viewing of a video stream. Specifically, the video stream can be uploaded from the transmitting station 102 and viewed at the receiving station 106 after processing. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
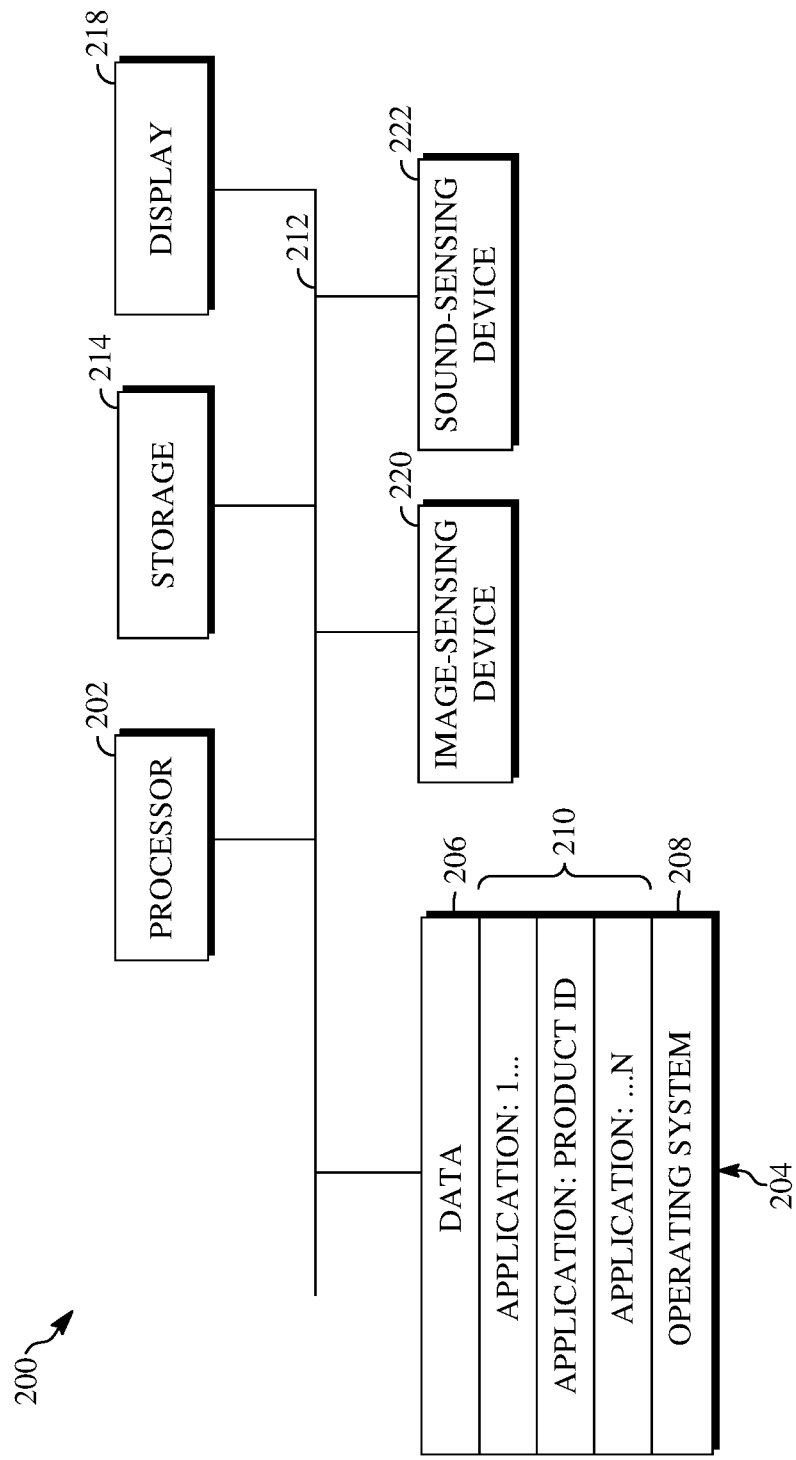
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video platform system 100 are possible. For example, an implementation can omit the network 104. In another implementation, a video stream can be uploaded from the transmitting station 102 and then stored for transmission at a later time to the receiving station 106 or any other device having memory. In one implementation, the receiving station 106 receives (e.g., via the network 104, a computer bus, and/or some communication pathway) and stores the processed video stream for later viewing. In an example implementation, a real-time transport protocol (RTP) is used for transmission of the processed video over the network 104. In another implementation, a transport protocol other than RTP may be used (e.g., a Hypertext Transfer Protocol-based (HTTP-based) video streaming protocol).

In some cases, the transmitting station 102 may be a device of a video uploader and the receiving station 106 may be a server of an online video platform. In some cases, the transmitting station 102 may be a server of an online video platform and the receiving station 106 may be a device of a person viewing videos at the online video platform. In some cases, the transmitting station 102 may be a device of a video uploader and the receiving station 106 may be a device of a person viewing videos at an online video platform, such as where a server of the online video platform is intermediary thereto.

FIG. 2 is a block diagram of an example of a computing device 200 that can implement a transmitting station or a receiving station. For example, a computing device such as the computing device 200 can implement the transmitting station 102 and/or the receiving station 106 shown in FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which include a product identification application that performs some or all of the techniques disclosed herein.

The computing device 200 can also include a secondary storage 214, which can, for example, be a memory card used with a mobile computing device. Because video may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. For example, the operations of the processor 202 can be distributed across multiple machines (wherein individual machines can have one or more processors) that can be coupled directly or across a local area or other network. In another example, the memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
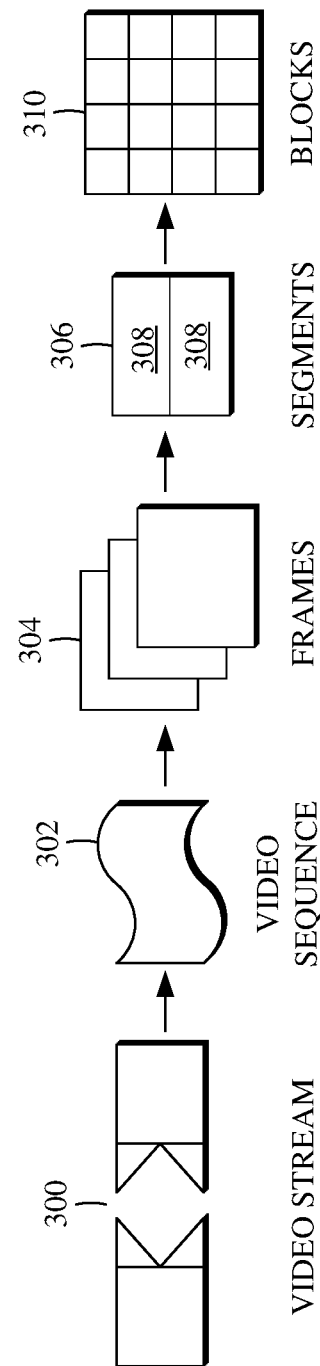
FIG. 3 is a diagram of an example of a video stream which may be uploaded to and processed at an online video platform.

FIG. 3 is a diagram of an example of a video stream 300 which may be uploaded to and processed at an online video platform. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
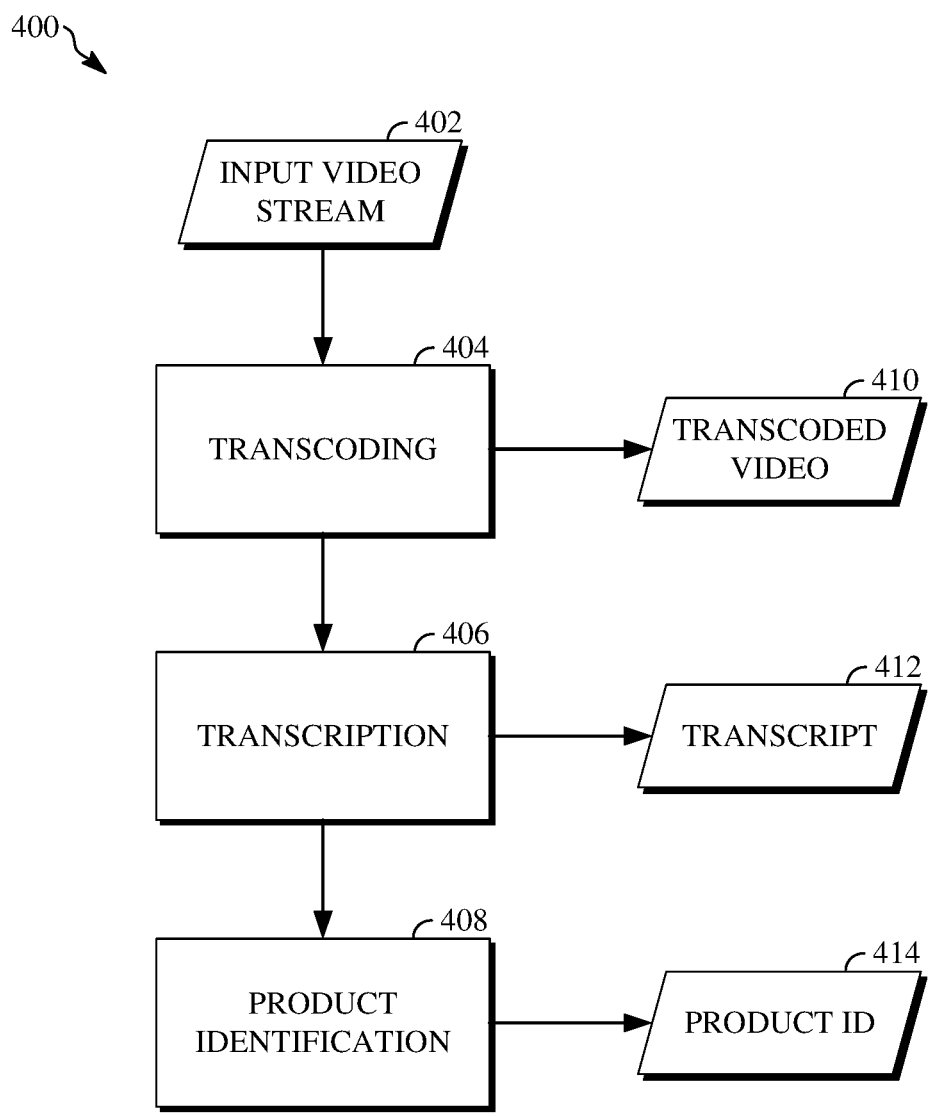
FIG. 4 is a block diagram of an example of a video stream processing system.

FIG. 4 is a block diagram of an example of a video stream processing system 400. The video stream processing system 400 can be implemented in a server of an online video platform, as described above, such as in the transmitting station 102 or the receiving station 106 shown in FIG. 1, such as by providing a computer software program stored in memory, for example, the memory 204 shown in FIG. 2. The computer software program can include machine instructions that, when executed by a processor such as the processor 202 shown in FIG. 2, cause the server to process an input video stream 402 in the manner described in FIG. 4. The video stream processing system 400 can also be implemented as specialized hardware included in, for example, the transmitting station 102 or the receiving station 106.

The input video stream 402 is a video stream, such as the video stream 300 shown in FIG. 3, which includes user generated video content and is received from a device of a video uploader. The video stream processing system 400 includes components for processing the input video stream 402, including a transcoding stage 404, a transcription stage 406, and a product identification stage 408.

The transcoding stage 404 processes the input video stream 402 to produce a transcoded video 410. The transcoded video 410 represents the user generated video content in a processed form. The transcoding stage 404 may produce the transcoded video 410 by one or more of encoding the input video stream 402, decoding the input video stream 402, converting the input video stream 402 in an encoded form or otherwise from a first format to a second format or otherwise preparing multiple formats of the video, changing a bitrate for later viewing of the input video stream 402 from a first bitrate to a second bitrate or otherwise preparing multiple bitrate versions of the video, changing a resolution of the input video stream 402 from first resolution to a second resolution or otherwise preparing multiple resolution versions of the video, a combination thereof, or the like.

The transcription stage 406 produces a transcript 412 of the video of the input video stream 402. The transcription stage 406 may, for example, use an automatic speech recognition processing aspect to produce the transcript 412. The transcription stage 406 may produce the transcript 412 based on the input video stream 402 or the transcoded video 410. Where the input video stream 402 is a pre-recorded video, the transcript 412 may be produced during playback of the video. Where the input video stream 402 is a livestreamed video, the transcript 412 may be produced in real-time or substantially in real-time with the processing thereof. In some implementations, the operations of the transcription stage 406 may be performed during the transcoding performed at the transcoding stage 404.

The product identification stage 408 determines a product identification 414 for a product which is the subject of some or all of the video of the input video stream 402. The product identification 414 is data which identifies a product. For example, the product identification 414 may include one or more of a model name, a manufacturer name, a release type, special features such as color or options, or the like for the product. The product identification stage 408 processes video and text associated with the input video stream 402 to determine the product identification 414. In particular, the product identification stage 408 may use either the input video stream 402 or the transcoded video 410 for the video aspect and the transcript 412 for the text aspect.

Figure 5:
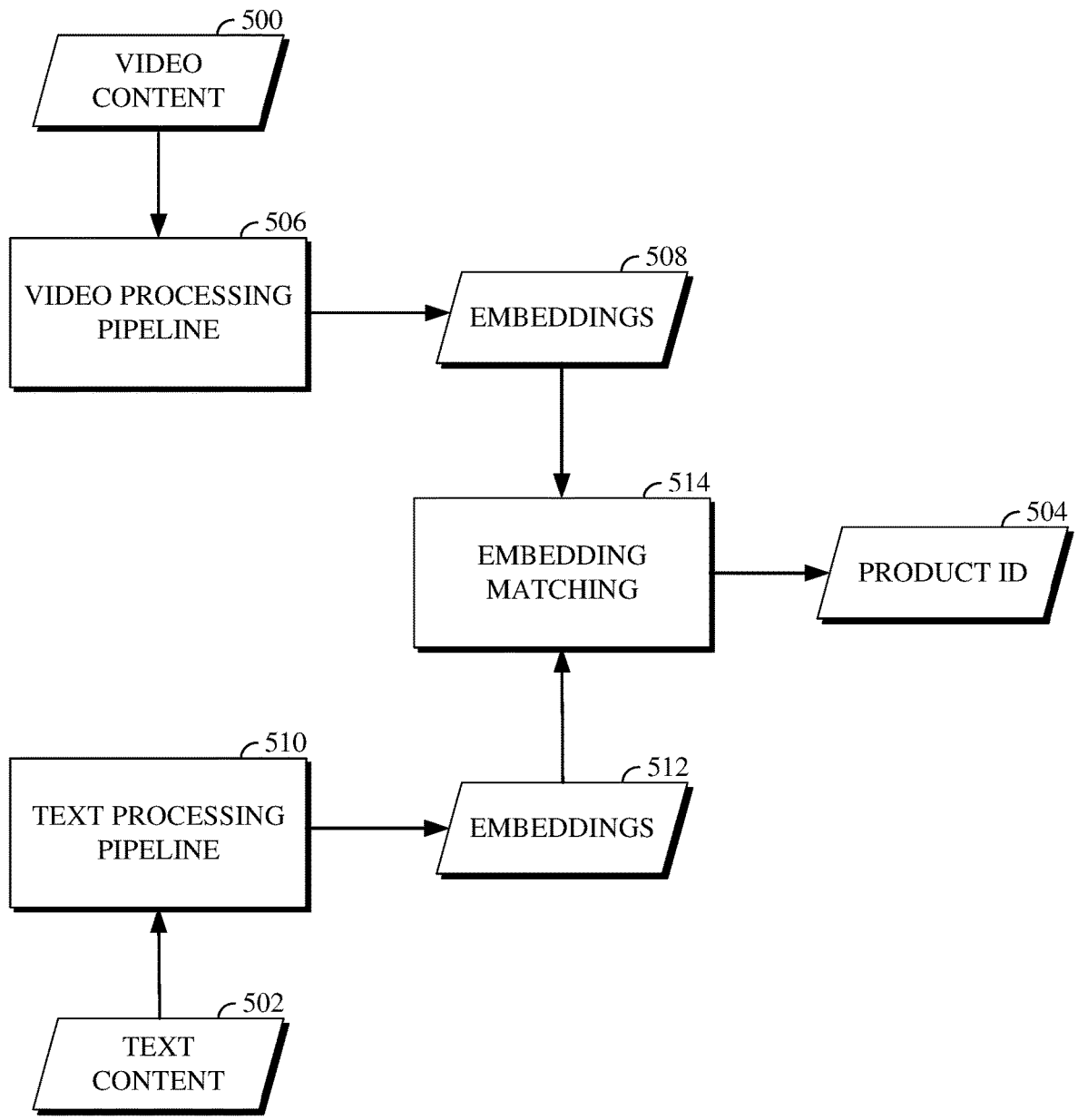
FIG. 5 is a block diagram of an example of a product identification stage of a video stream processing system.

FIG. 5 is a block diagram of an example of a product identification stage of a video stream processing system, which may, for example, be the product identification stage 408 shown in FIG. 4. The product identification stage receives as input video content 500 and text content 502 and produces or otherwise determines as output a product identification 504. The video content 500 may, for example, be the input video stream 402 or the transcoded video 410 shown in FIG. 4. In particular, the video content 500 includes one or more frames of a video sequence of a video hosted or streamed at an online video platform and may thus correspond to frame-level content or chunk-level content of the video. The text content 502 includes text associated with the video content 500. For example, the text content 502 may include one or more of a transcript generated for the video, for example, the transcript 412 shown in FIG. 4, a title of the video, a description of the video, metadata or other data associated with the video, or a combination thereof. The product identification 504 may, for example, be the product identification 414 shown in FIG. 4.

The product identification stage uses separate processing pipelines to process the inputs. In particular, a video processing pipeline 506 processes the video content 500 to determine embeddings 508, and a text processing pipeline 510 processes the text content 502 to determine embeddings 512. The embeddings 508 and the embeddings 512 are logical elements for representing information output respectively by the video processing pipeline 506 and the text processing pipeline 510. In one particular example, the embeddings 508 and the embeddings 512 may be vectors of floating point values, although other data storage types and elements may be used. The embeddings 508 are used to represent one or more candidate products identified based on the processing at the video processing pipeline 506. The embeddings 512 are used to represent one or more candidate products identified based on the processing at the text processing pipeline 510. The candidate products represented by the embeddings 508 and the candidate products represented by the embeddings 512 may all be the same, may be partially the same and partially different, or may all be different.

To determine the embeddings 508, the video processing pipeline 506 processes the video content 500 at the frame level including by performing object detection using one or more machine learning models. The embeddings 508 represent pixel information from bounding boxes surrounding the detected objects within a given frame of the video content 500. Implementations and examples of the video processing pipeline 506 are described below with respect to FIG. 6.

To determine the embeddings 512, the text processing pipeline processes the text content 502 by identifying product candidates based on entity information extracted from the text content 502. Object detection is then performed using one or more machine learning models against images obtained from searching one or more systems for the product candidates. The embeddings 512 represent pixel information from bounding boxes surrounding the detected objects within a given image. Implementations and examples of the text processing pipeline 510 are described below with respect to FIG. 7.

The video processing pipeline 506 and the text processing pipeline 510 thus use one or more machine learning models to respectively determine the embeddings 508 and the embeddings 512. A machine learning model used at the video processing pipeline 506 and/or at the text processing pipeline 510 may be or include one or more of a neural network (e.g., a convolutional neural network, recurrent neural network, or other neural network), decision tree, support vector machine, Bayesian network, genetic algorithm, deep learning system separate from a neural network, or other machine learning model. For example, the object detection performed at the video processing pipeline 506 and the text processing pipeline 510 may use a deep learning convolutional neural network trained for object detection within images and video frames. The video processing pipeline 506 and the text processing pipeline 510 may use the same or different one or more machine learning models.

The product identification stage includes an embedding matching component 514 which processes the embeddings 508 and the embeddings 512 to determine the product identification 504. The embedding matching component 514 first produces an index of the candidate products represented by the embeddings 512. The index may, for example, be a light-weight, on-the-fly index of entries associated with the embeddings 512. An entry within the index may include a key representative of an identifier of the subject candidate product and data associated with the respective embedding 512, such as a floating point value. The index is produced on a per-video basis such that the index is specific to the subject video. This approach emphasizes products which are featured with intentionality within the video and reduces computational load and maintenance burdens on the online video platform system by limiting the pool of indices against which the embedding matching is performed.

The embedding matching component 514 then performs a nearest neighbor search against the candidate products represented by the embeddings 508 and the embeddings 512. To perform the nearest neighbor search, the embedding matching component 514 compares the embeddings 508 against the index to identify entries of the index which include data similar to (e.g., within a threshold variance) or matching data of the embeddings 508. For example, the comparison may be performed between floating point values of the embeddings 508 and floating point values of entries of the index. The embedding matching component 514 identifies K nearest neighbors as the K index entries that are most similar to the embeddings 508, in which K is an integer having a value greater than or equal to 1.

The embedding matching component 514 then evaluates those K nearest neighbors to determine the product identification 504. In particular, the embedding matching component 514 evaluates the floating point values of the K nearest neighbors to identify the floating point value which has the highest mode amongst them. For example, if K is equal to 5 and 3 of those 5 nearest neighbors share the same floating point value, the candidate product associated with that floating point value (e.g., the candidate product associated with the one or more embeddings 508 having that floating point value) is identified as the product identification 504.

In some implementations, the evaluation of the K nearest neighbors is performed to determine a final candidate product for the video frame or chunk represented by the video content 500. For example, after the final candidate product is determined, a video-level aggregation may be performed against the final candidate products determined at different times during the subject video to determine the product identification 504. In some such implementations, performing the video-level aggregation includes determining confidence scores for the final candidate products determined at the frame-level or chunk-level. After some or all of the subject video has been processed, the final candidate product associated with the highest confidence score may be identified as the product identification 504.

The particular approach to identifying the product identification 504 may be based on the type of video from which the video content 500 and the text content 502 derive. For example, where the video is a livestreamed video, the product identification 504 may be identified based on the evaluation of the K nearest neighbors for a given frame or chunk. In another example, where the video is a pre-recorded and thus hosted video, the product identification 504 may be identified either based on the evaluation of the K nearest neighbors for a given frame or chunk or based on an evaluation of confidence scores determined at various times during the video.

In either case, a timestamp associated with the product identification 504 representing a time during the subject video in which the subject product is featured may be stored and later used to output the product identification 504 in one or more ways. In some implementations, the product identification 504 or information associated therewith may be presented to a viewer watching the video. For example, the product identification 504 may include an annotation (e.g., including a product name and/or a website link) overlaying one or more frames of the video. The annotation may be located within, adjacent, or nearby to a bounding box within which the subject product is identified, in which the frame or frames corresponding to the bounding box are identified based on a timestamp associated with the product identification 504.

In some implementations, the product identification 504 may be used during a search of videos at an online video platform. For example, when a user searches the online video platform for videos associated with the product identified by the product identification 504, the video may be identified in the search results along with the timestamp within the video at which the product is featured. In some implementations, a product name and/or a website link associated with the product identification 504 may be presented along with the search results.

Figure 6:
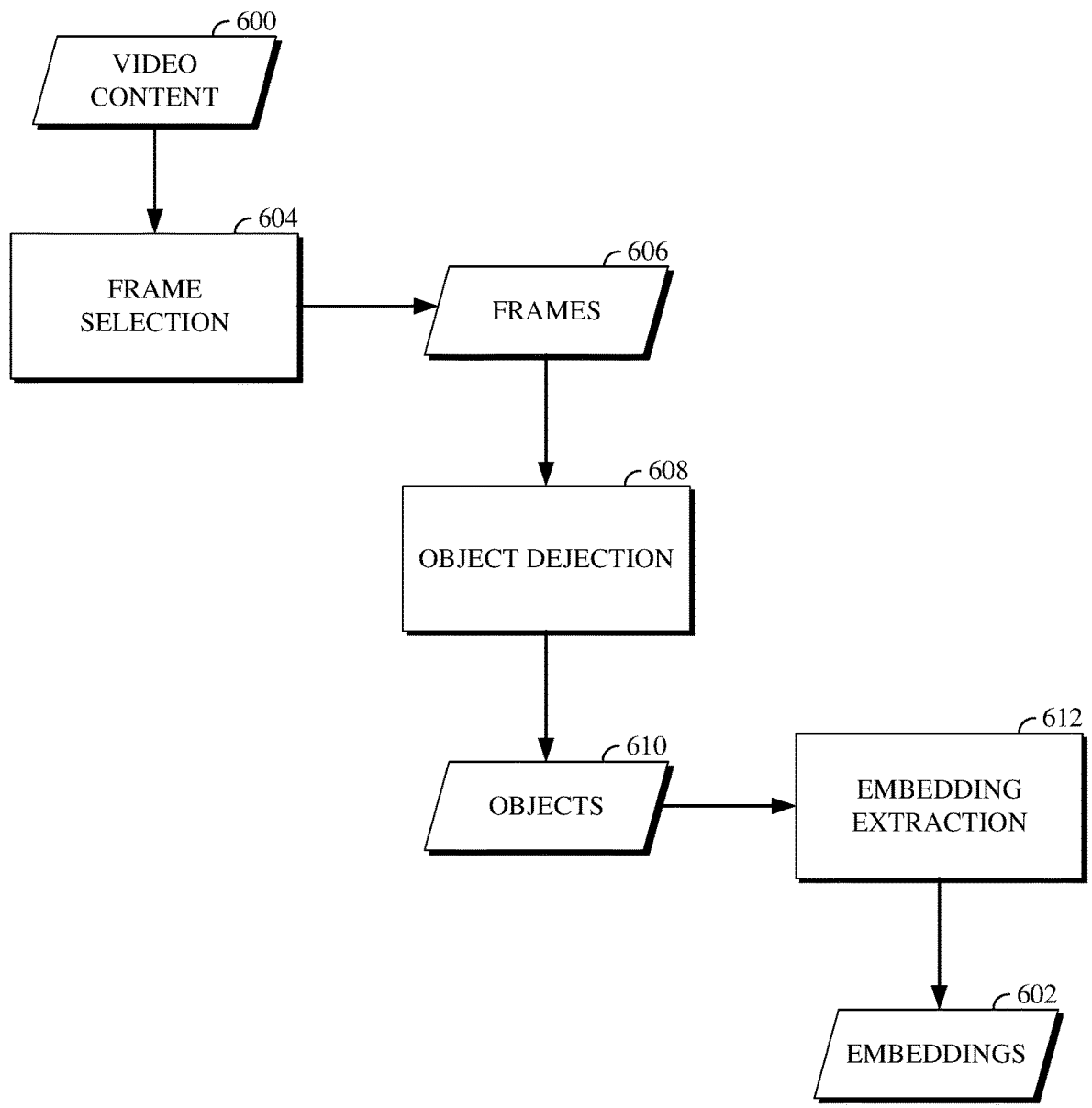
FIG. 6 is a block diagram of an example of a video processing pipeline of a product identification stage.

FIG. 6 is a block diagram of an example of a video processing pipeline of a product identification stage, which may, for example, be the video processing pipeline 506 shown in FIG. 5. The video processing pipeline receives as input video content 600 and produces as output embeddings 602, which may, for example, respectively be the video content 500 and the embeddings 508 shown in FIG. 5. The video processing pipeline includes a frame selection component 604 which selects one or more frames 606 of the video content 600 to use to determine the embeddings 602, an object detection component 608 which performs object detection against the frames 606 to identify objects 610, and an embedding extraction component 612 which processes the objects 610 to determine the embeddings 602.

The frame selection component 604 selects the frames 606 in one or more ways. In some implementations, the frame selection component 604 selects the frames 606 by sampling N frames per second in which N is an integer greater than or equal to one. In some such implementations, the frames 606 sampled by the frame selection component 604 are selected based on those frames 606 being identified as keyframes. In some implementations, the frame selection component 604 selects the frames 606 based on a threshold difference of video data between ones of the frames 606 and frames preceding them in the video sequence, which may, for example, be measured using motion vectors computed during an encoding process of the subject video.

The particular manner in which the frame selection component 604 selects the frames 606 may be based on computational resource availability for the online video platform and/or a type of video being processed. For example, where computational resources are abundant, the frame selection component 604 can densely sample N frames per second; however, where computational resources are limited, the frame selection component 604 can instead select amongst keyframes instead. In another example, where the subject video is a livestreamed video, the frame selection process may be more quickly performed using motion vectors and/or other motion detection techniques.

The object detection component 608 uses a machine learning model to detect the objects 610 within the frames 606. The objects 610 may be people or things appearing within the frames 606. The object detection component 608 draws bounding boxes around the objects 610 responsive to their detection. The bounding boxes are used to represent locations of the objects 610 within the frames 606. In some implementations, the bounding boxes themselves may be used as the objects 610.

The embedding extraction component 612 extracts features of the objects 610 and uses those features to determine the embeddings 602. The features extracted by the embedding extraction component 612 include image data derived from the pixels located within the bounding boxes of the objects 610. The input for this process is the group of pixels corresponding to the bounding box, which is processed to convert those pixel values to another format represented as the embeddings. For example, the embedding extraction component 612 can output a floating point value for the group of pixels. In some implementations, the embedding extraction component 612 may use a machine learning model. The machine learning model may be the same as or different from the machine learning model used by the object detection component 608.

Figure 7:
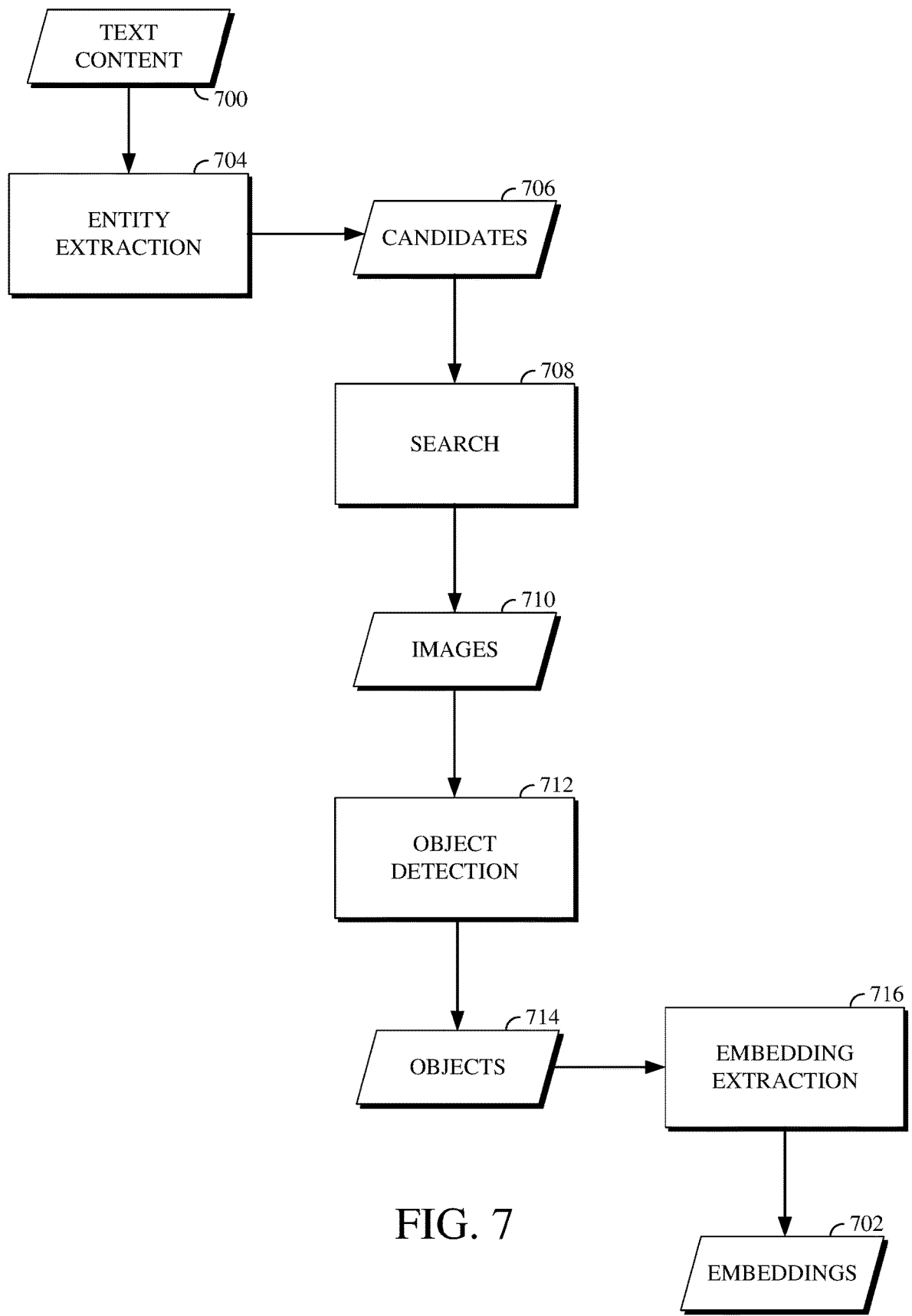
FIG. 7 is a block diagram of an example of a text processing pipeline of a product identification stage.

FIG. 7 is a block diagram of an example of a text processing pipeline of a product identification stage, which may, for example, be the text processing pipeline 510 shown in FIG. 5. The text processing pipeline receives as input text content 700 and produces as output embeddings 702, which may, for example, respectively be the text content 502 and the embeddings 512 shown in FIG. 5. The text processing pipeline includes an entity extraction component 704 which extracts entities from the text content 700 to identify object candidates 706, a search component 708 which performs a search based on the object candidates 706 to identify images 710 of the object candidates 706, an object detection component 712 which performs object detection against the images 710 to identify objects 714, and an embedding extraction component 716 which processes the objects 714 to determine the embeddings 702.

The entity extraction component 704 extracts entities in the form of data or metadata from the text content 700. The entities may, for example, be keywords or phrases identified within a transcript of the subject video, the title of the video, a description of the video, or the like. For example, an entity may identify a product name, a manufacturer name, a model type, other information about the product, or the like, or a combination thereof. The entity extraction component 704 may use a machine learning model trained for language and context detection to extract the entities from the text content 700. The entity extraction component 704 determines the object candidates 706 based on the entities. In some implementations, the machine learning model may be trained for sentiment analysis to evaluate whether a product for which an entity is extracted is featured with intentionality.

In some cases, an entity extracted from the text content 700 may fully identify a specific object candidate 706, such as based on product name and model type. However, in some cases, an entity may omit information used to accurately identify an object candidate 706. For example, the entity may identify a product name without identifying a specific model type. In some implementations, where an entity omits such information, the entity extraction component 704 may determine multiple potential object candidates 706 based on the entity such as to increase the chances of one of those potential object candidates 706 being the correct product featured in the subject video.

The search component 708 performs a search for one or more images using an internet search engine based on information associated with the object candidates 706, such as based on the data and/or metadata extracted as the entities used to determine those object candidates 706. The search component 708 performs the search or searches to identify the images 710, which are static images depicting one or more objects including a given one of the object candidates 706. Where multiple objects are depicted in an image 710, the main object which is the focus of the image 710 is considered to represent the object candidate 706. The internet search engine used for the search may be external to the online video platform. For example, the internet search engine may be considered to be external to the online video platform where uniform resource locators (URLs) of the internet search engine and the online video platform have different domain names or different subdomain names.

The object detection component 712 and the embedding extraction component 716 may operate in the same or in a substantially similar manner to the object detection component 608 and the embedding extraction component 612 shown in FIG. 6. In particular, the object detection component 712 uses a machine learning model to detect the objects 714 within the images 710 including by drawing bounding boxes around those objects 714 within the images 610, and the embedding extraction component 716 extracts features of the objects 714 and uses those features to determine the embeddings 702 such as by converting pixel information representative of those features into floating point values.

Figure 8:
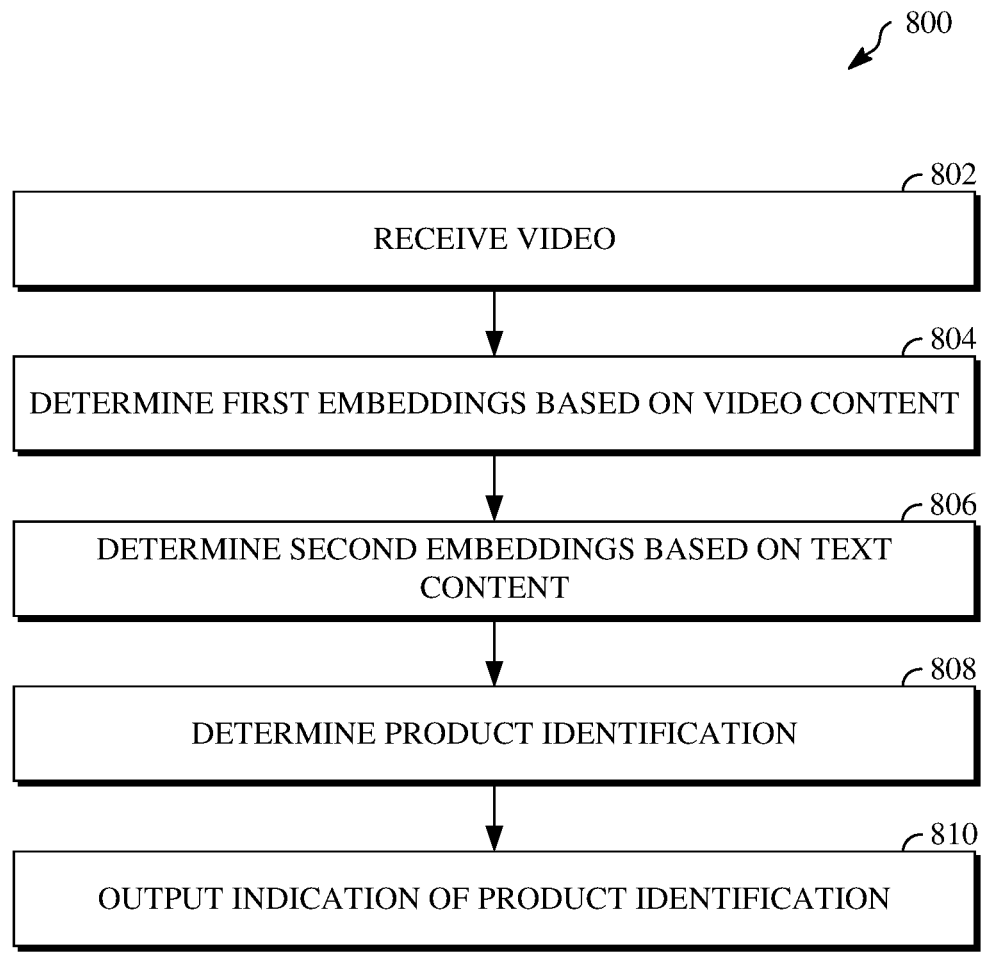
FIG. 8 is a flowchart diagram of an example of a technique for automated product identification within a video.
Figure 9:
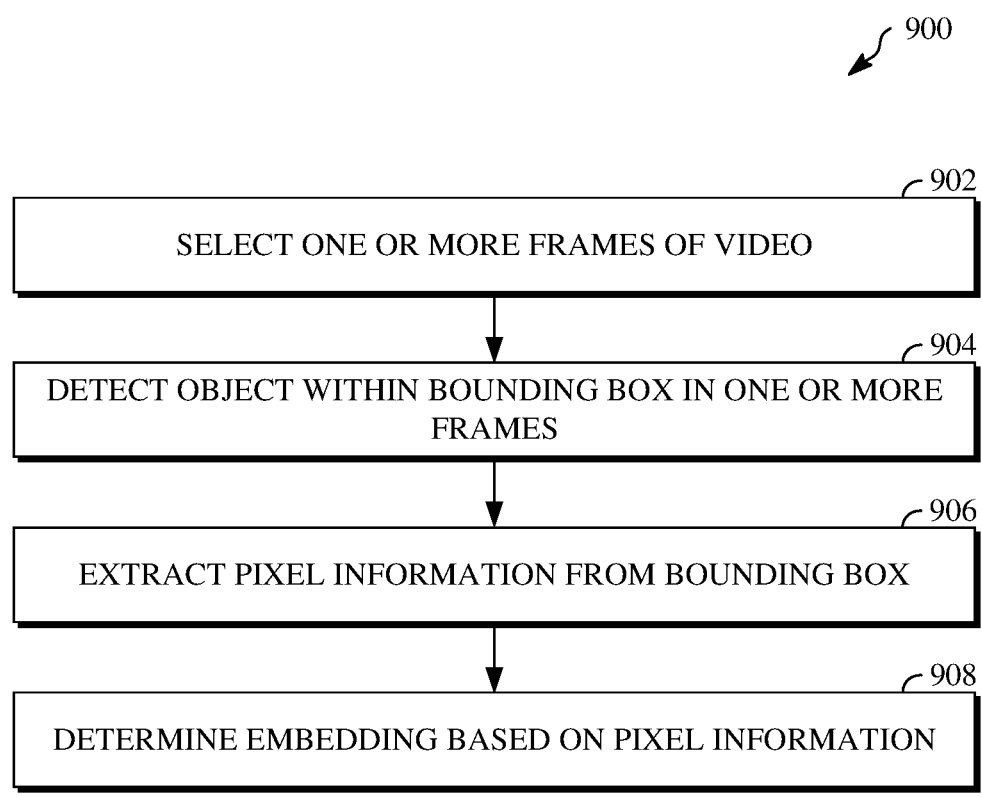
FIG. 9 is a flowchart diagram of an example of a technique for determining embeddings from video content associated with a video.
Figure 10:
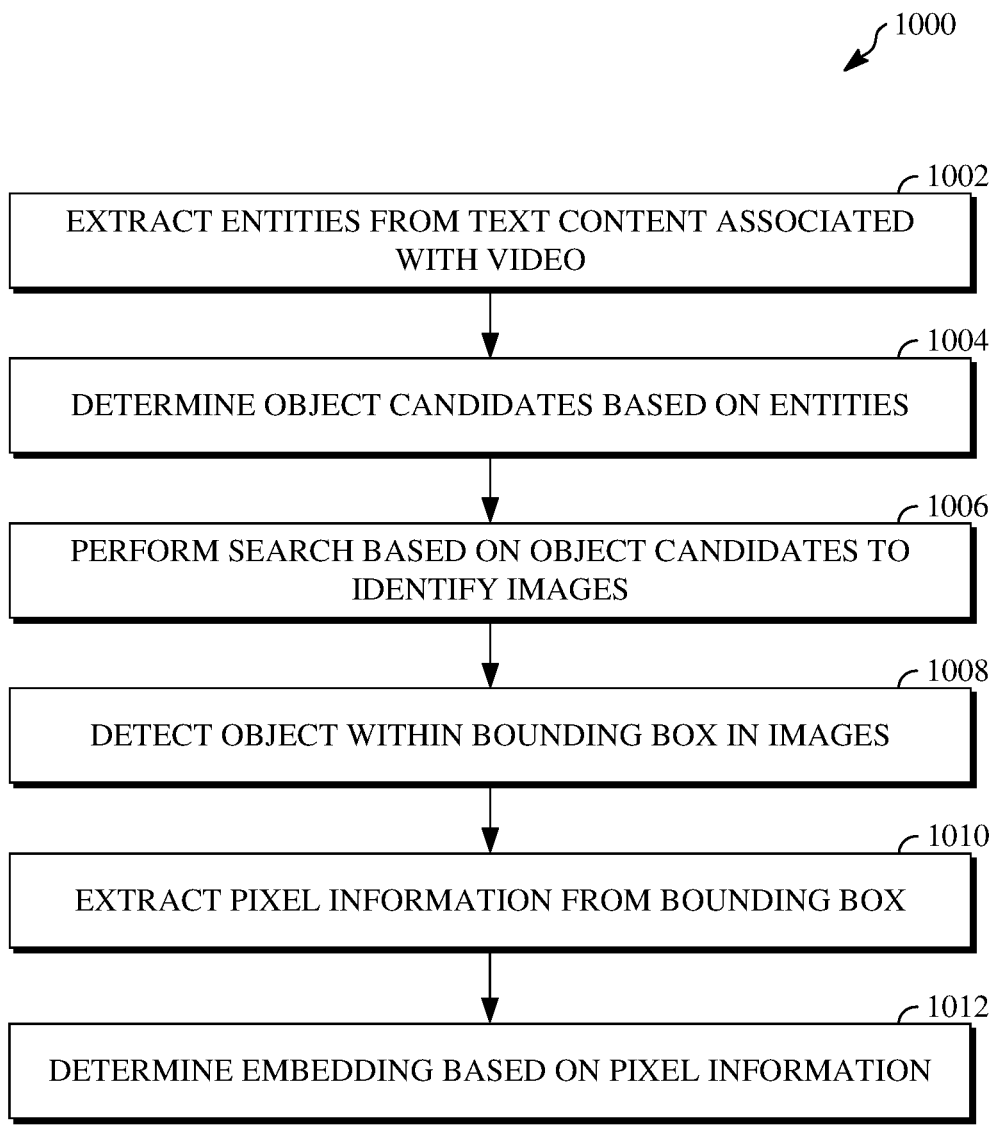
FIG. 10 is a flowchart diagram of an example of a technique for determining embeddings from video content associated with a video.

Further details of techniques for automated product identification within hosted and streamed videos are now described. FIG. 8 is a flowchart diagram of an example of a technique 800 for automated product identification within a video. FIG. 9 is a flowchart diagram of an example of a technique 900 for determining embeddings from video content associated with a video. FIG. 10 is a flowchart diagram of an example of a technique 1000 for determining embeddings from video content associated with a video.

The technique 800, the technique 900, and/or the technique 1000 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800, the technique 900, and/or the technique 1000. The technique 800, the technique 900, and/or the technique 1000 can be implemented using specialized hardware or firmware. For example, a hardware component configured to perform the technique 800, the technique 900, and/or the technique 1000. As explained above, some computing devices may have multiple memories or processors, and the operations described in the technique 800, the technique 900, and/or the technique 1000 can be distributed using multiple processors, memories, or both.

For simplicity of explanation, the technique 800, the technique 900, and the technique 1000 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for automated product identification within a video is shown. At 802, a video is received. The video may, for example, be received at an online video platform. The video may be a pre-recorded video which is uploaded to the online video platform for hosting such as through a website or application associated with the online video platform. Alternatively, the video may be a livestreamed video which is uploaded in real-time to the online video platform over a real-time streaming protocol connecting a device at which the video is being recorded to the online video platform.

At 804, first embeddings are determined based on video content of the video. The first embeddings represent product candidates identified based on the one or more frames selected from the video. Determining the first embeddings includes detecting a first object within one or more frames selected from the video and determining first embeddings based on pixel information associated with the first object. Further implementations and examples of techniques for determining the first embeddings are described below with respect to FIG. 9.

At 806, second embeddings are determined based on text content associated with the video. The second embeddings represent product candidates identified based on the entities extracted from the text content. Determining the second embeddings includes determining one or more object candidates based on entities extracted from text content associated with the video, detecting a second object within one or more images identified responsive to a search based on the one or more object candidates, and determining second embeddings based pixel information associated with the second object. Further implementations and examples of techniques for determining the first embeddings are described below with respect to FIG. 10.

At 808, a product identification representative of a product featured in the video is determined. Determining the product identification includes producing a product candidate index based on the second embeddings, determining a number of nearest neighbors based on a comparison of the first embeddings against entries of the product candidate index, and determining a product identification representative of a product featured in the video based on the number of nearest neighbors. In particular, floating point values determined based on the video content (e.g., the first embeddings) are compared against the entries within the product candidate index (e.g., floating point values determined based on the text content (e.g., the second embeddings)) to determine the number of nearest neighbors. The floating point value with the highest mode amongst the nearest neighbors is identified, and the candidate product associated therewith is determined as the product featured in the video. The product identification is thus determined based on that candidate product. In this way, the determination of a product identification representative of a product featured in the video may be made based on a comparison of the first embeddings against the entries of the product candidate index.

At 810, an indication of the product identification is output. For example, the indication of the product identification may be output at the online video platform at which the video was received. On one example, outputting the indication of the product identification at the online video platform may include outputting an annotation including the indication of the product identification proximate to a bounding box associated with an object detected within one or more frames of the video during a playback of the video at the online video platform. In another example, the indication of the product identification is a representation of the video output at the online video platform responsive to a user search at the online video platform for videos featuring the product.

In some implementations, the product identification determined based on the comparison of the first embeddings against the entries of the product candidate index is not the final product identification for which an indication is output. For example, the product identification may be one of multiple product identifications determined for the video. In some such implementations, a confidence score may be determined for each of the product identifications, in which each of the product identifications corresponds to one of a variety of times during the video. The final product identification may then be determined based on an evaluation of the various confidence scores. Thus, the indication output may be an indication of the final product identification.

Referring next to FIG. 9, the technique 900 for determining embeddings from video content associated with a video is shown. At 902, one or more frames of the video are selected. In one example, the one or more frames may be selected according to a sampling rate determined for the video. For example, the sampling rate may be based on computational resource availability, a defined frame or time interval for sampling, a frame type (e.g., keyframe), or the like. In another example, the one or more frames may be selected based on motion information determined, such as motion vectors computed between a current frame and a previously encoded frame of the video sequence of the video.

At 904, an object is detected within a bounding box in the one or more frames. Detecting the object within the bounding box includes perform object detection against the one or more frames to detect an object within a bounding box in the one or more frames. The object detection may, for example, be performed using a machine learning model trained for object detection. The bounding box is a generally rectangular area enclosing some or all of the detected object within the one or more frames. The object may be in one or more frames by virtue of the object being present in one or more frames of the video, regardless of motion, translation, or warping of the object between frames.

At 906, pixel information is extracted from the bounding box. The pixel information refers to RGB values, YUV values, other color values, other luminance and/or chrominance values, and/or other values enclosed within the one or more frames by the bounding box. Extracting the pixel information can include copying the values from within the bounding box to a separate source, such as a buffer, data store, or the like.

At 908, an embedding is determined based on the pixel information. Determining the embedding can include using the pixel information of the bounding box, such as which has been extracted from the bounding box, to compute a floating point value vector for the pixel information as the embedding. The embedding is one of multiple embeddings which may be determined for the purpose of identifying a given product featured within the video.

Referring finally to FIG. 10, the technique 1000 for determining embeddings from video content associated with a video is shown. At 1002, entities are extracted from text content associated with the video. The entities are extracted using a text parsing software aspect configured to read text in one or more languages. The text may be a title of the video, a description of the video, a transcript produced for the video, or the like. The entities are extracted to a buffer, data store, or the like for further processing.

At 1004, one or more object candidates are determined based on the entities. In particular, the entities are processed to identify one or more of a product name, a manufacturer name, a model type, and/or other information usable to identify an object candidate which may be a particular product featured in the video. In some cases, the entities are processed to identify multiple object candidates, for example, where there are multiple potential products determined based on the entities. In some cases, the entities may partially represent a potential product such as based on referencing a product name without a model type or a manufacturer name without a product name. In such a case, additional entities may be evaluated to cover multiple possible products which could be extrapolated from the partial representations by the entities.

At 1006, a search is performed based on the object candidates to identify one or more images. The search is performed using an internet search engine external to the online video platform that receives the video. Performing the search includes entering the object candidate information determined based on the entities into a search string for processing by the internet search engine. The internet search engine may perform a web search for websites or an image search for images. The search is ultimately performed to identify images and so results of the search are parsed for images. Those images are retrieved from the various sources and stored in a buffer, data store, or the like for further processing.

At 1008, an object is detected within a bounding box in the one or more images. Detecting the object within the bounding box includes perform object detection against the one or more images to detect an object within a bounding box in the one or images frames. The object detection may, for example, be performed using a machine learning model trained for object detection. The bounding box is a generally rectangular area enclosing some or all of the detected object within the one or more images. The object may be in one or more images by virtue of the object being separately included in each of those one or more images.

At 1010, pixel information is extracted from the bounding box. The pixel information refers to RGB values, YUV values, other color values, other luminance and/or chrominance values, and/or other values enclosed within the one or more images by the bounding box. Extracting the pixel information can include copying the values from within the bounding box to a separate source, such as a buffer, data store, or the like.

At 1012, an embedding is determined based on the pixel information. Determining the embedding can include using the pixel information of the bounding box, such as which has been extracted from the bounding box, to compute a floating point value vector for the pixel information as the embedding. The embedding is one of multiple embeddings which may be determined for the purpose of identifying a given product featured within the video.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
   receiving a video at an online video platform;
   detecting a first object within one or more frames selected from the video;
   determining, based on pixel information associated with the first object, first embeddings vectorially representing the first object;
   determining one or more object candidates based on entities extracted from text content associated with the video;
   detecting a second object within one or more images identified responsive to a search based on the one or more object candidates;
   determining, based pixel information associated with the second object, second embeddings vectorially representing the second object;
   producing, based on the second embeddings, a product candidate index including entries corresponding to product candidates specific to the video;
   determining a number of nearest neighbors based on a comparison of the first embeddings against the entries of the product candidate index;
   determining a product identification representative of a product featured in the video based on the number of nearest neighbors; and
   outputting an indication of the product identification at the online video platform.

2. The method of claim 1, wherein the first embeddings represent product candidates identified based on the one or more frames selected from the video and the second embeddings represent product candidates identified based on the entities extracted from the text content.

3. The method of claim 1, further comprising:
   determining a confidence score for the product identification; and determining a final product identification based on an evaluation of confidence scores for product identifications corresponding to various times during the video, wherein the indication output at the online video platform is an indication of the final product identification.

4. The method of claim 1, wherein detecting the first object within the one or more frames comprises identifying a bounding box for the first object within the one or more frames, and wherein outputting the indication of the product identification at the online video platform comprises outputting an annotation including the indication of the product identification proximate to the bounding box during a playback of the video at the online video platform.

5. The method of claim 1, wherein the indication of the product identification is a representation of the video output at the online video platform responsive to a user search at the online video platform for videos featuring the product.

6. An apparatus, comprising:
a memory; and
a processor configured to execute instructions stored in the memory to:
receive a video at an online video platform;
determine first embeddings vectorially representative of one or more first candidate products based on video content of the video;
determine second embeddings vectorially representative of one or more second candidate products based on text content associated with the video;
produce a product candidate index specific to the video based on the second embeddings;
determine a product identification representative of a product featured in the video based on a comparison of the first embeddings against entries of the product candidate index; and
output an indication of the product identification at the online video platform.

7. The apparatus of claim 6, wherein, to determine the first embeddings, the processor is configured to execute the instructions to:
select one or more frames of the video;
perform object detection against the one or more frames to detect a first object within a bounding box in the one or more frames; and
determine an embedding of the first embeddings based on pixel information of the bounding box.

8. The apparatus of claim 7, the one or more frames are selected according to a sampling rate determined for the video.

9. The apparatus of claim 7, wherein, to output the indication of the product identification, the processor is configured to execute the instructions to:
output an annotation including the indication of the product identification proximate to the bounding box during a playback of the video at the online video platform.

10. The apparatus of claim 6, wherein, to determine the second embeddings, the processor is configured to execute the instructions to:
extract one or more entities from the text content;
determine one or more object candidates based on the one or more entities;
perform a search based on the one or more object candidates to identify one or more images;
perform object detection against the one or more images to detect a second object within a bounding box in the one or more images; and
determine an embedding of the second embeddings based on pixel information of the bounding box.

11. The apparatus of claim 10, wherein the one or more entities include data or metadata corresponding to one or more of a product name, a manufacturer name, or a model type.

12. The apparatus of claim 10, wherein the text content includes a transcript of the video and the processor is further configured to execute the instructions to produce the transcript.

13. The apparatus of claim 6, wherein, to determine the product identification, the processor is configured to execute the instructions to:
determine a number of nearest neighbors based on a comparison of the first embeddings against entries of the product candidate index; and
determine the product identification based on a highest mode of the number of nearest neighbors.

14. The apparatus of claim 6, wherein the indication of the product identification is a representation of the video output at the online video platform responsive to a user search at the online video platform for videos featuring the product.

15. A non-transitory computer readable storage device including program instructions that, when executed by a processor, cause the processor to perform operations, the operations comprising:
determining first embeddings vectorially representing first candidate products based on video content of a video;
determining second embeddings vectorially representing second candidate products based on text content associated with the video;
determining a product identification representative of a product featured in the video based on a comparison of the first embeddings and the second embeddings; and
outputting an indication of the product identification.

16. The non-transitory computer readable storage device of claim 15, wherein the operations for determining the first embeddings comprise:
selecting one or more frames of the video;
performing object detection against the one or more frames to detect a first object within a bounding box in the one or more frames; and
determining an embedding of the first embeddings based on pixel information of the bounding box.

17. The non-transitory computer readable storage device of claim 16, wherein the video is received at an online video platform, and wherein the operations for outputting the indication of the product identification comprise:
outputting an annotation including the indication of the product identification proximate to the bounding box during a playback of the video at the online video platform.

18. The non-transitory computer readable storage device of claim 15, wherein the operations for determining the second embeddings comprise:
extracting one or more entities from the text content;
determining one or more object candidates based on the one or more entities;
performing a search based on the one or more object candidates to identify one or more images;
performing object detection against the one or more images to detect a second object within a bounding box in the one or more images; and
determining an embedding of the second embeddings based on pixel information of the bounding box.

19. The non-transitory computer readable storage device of claim 18, wherein the video is received at an online video platform, and wherein the search is performed using an internet search engine external to the online video platform.

20. The non-transitory computer readable storage device of claim 15, the operations further comprising:
- determining a confidence score for the product identification; and
- determining a final product identification based on an evaluation of confidence scores for product identifications corresponding to various times during the video,
- wherein the indication output is an indication of the final product identification.

\* \* \* \* \*